July 13, 1943. W. J. STRONG 2,324,117
APPARATUS FOR BUFFING TIRES
Filed July 11, 1940
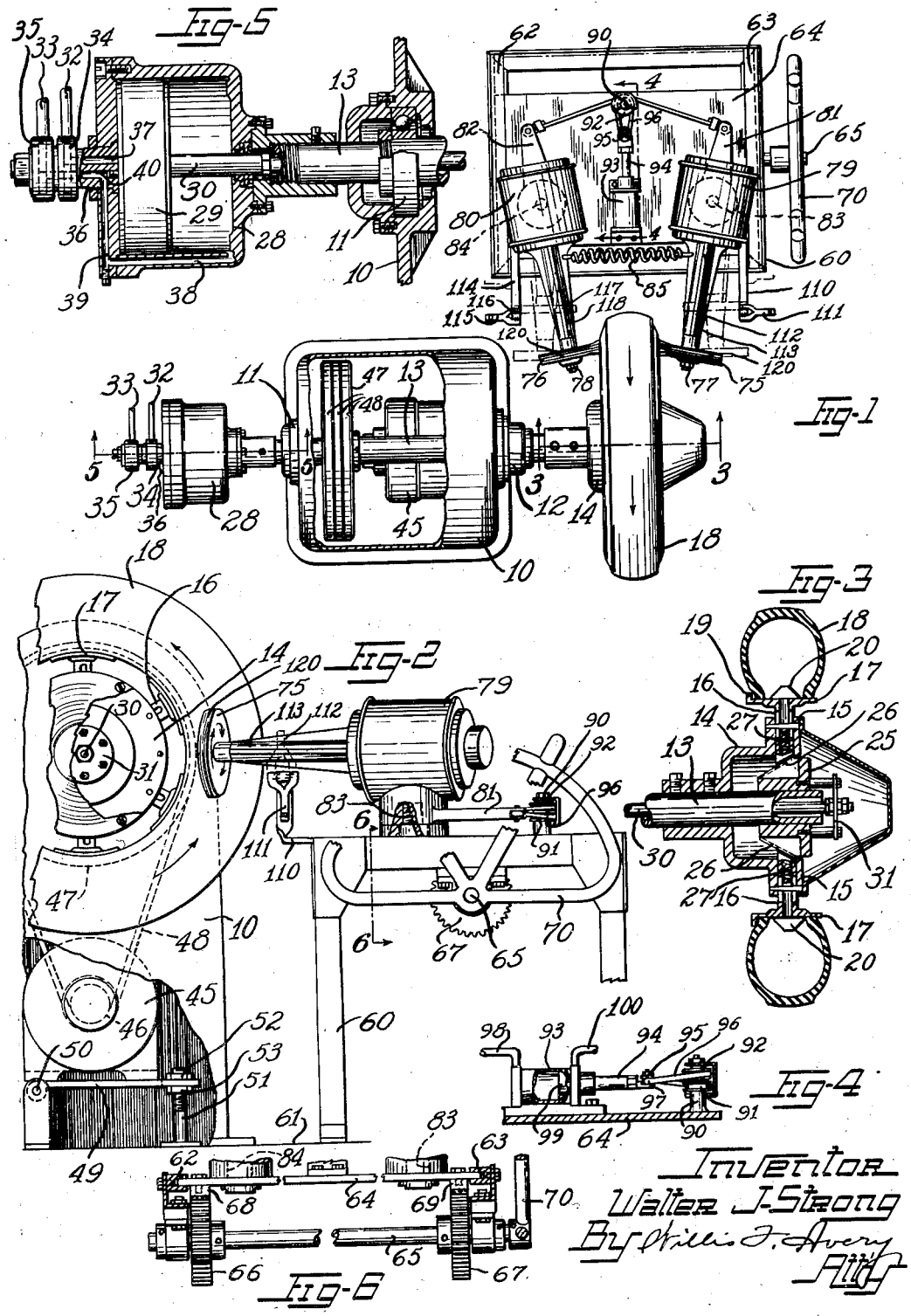
Inventor
Walter J. Strong Patented July 13, 1943

2,324,117

UNITED STATES PATENT OFFICE 2,324,117

APPARATUS FOR BUFFING TIRES

Walter J. Strong, Cuyahoga Falls, Ohio, assignor to The B. F. Goodrich Company, New York, N. Y., a corporation of New York Application July 11, 1940, Serial No. 344,926

3 Claims. (Cl. 51—42)

This invention relates to apparatus for buffing or cleaning annular articles such as tire casings and is especially useful in buffing light colored sidewalls of tires.

During the manufacture of tires, the tires have been molded and the sidewalls thereof have often been soiled by contact with the face of the mold, especially where the sidewalls of the tire are of white or other light colored material. Any discoloration has been difficult and often impossible to remove by washing or by hand scrubbing.

The principal objects of the present invention are to provide an improved buffing wheel of rubber material for buffing the surface of a tire; to provide for simultaneous buffing of the opposite sidewalls of a tire; to provide improved apparatus for selective buffing of one side only of the tire; to provide for uniform application of pressure to the scrubbing or buffing members; to provide improved apparatus for driving the tire during the buffing operation; to provide quick and positive chucking and release of the tire; and generally to provide simplicity and economy of apparatus.

These and other objects will appear from the following description and the accompanying drawing.

Of the drawing

Fig. 1 is a plan view of the apparatus of the invention, part of the casing being broken away to show the motor drive.

Fig. 2 is a side elevation thereof, parts being broken away.

Fig. 3 is a cross-sectional detail view of the chuck with a tire thereon taken on line 3—3 of Fig. 1, parts being broken away.

Fig. 4 is a detail cross-sectional view taken on line 4—4 of Fig. 1.

Fig. 5 is an enlarged sectional view of the chuck-operating mechanism taken on line 5—5 of Fig. 1, parts being broken away.

Fig. 6 is a detail sectional view taken on line 6—6 of Fig. 2.

According to the invention a tire casing is rapidly chucked and released for driving it at a high rate of speed, while one or more buffing wheels are automatically held against the sidewalls of the casing and advanced progressively over its surface to remove stains and blemishes. One side of the tire may be cleaned at a time if desired and the other wheel held out of contact therewith, and the wheels may be simultaneously lifted from the tire surface and withdrawn. Chucking and release of the tires may be accomplished while the spindle is rotating, but it is preferred to chuck the tires with the spindle stationary when the spindle is operated at high speeds. By use of an improved buffing wheel of flexible rubber material, a smooth clean surface is provided without grooves or ridges such as would result from the use of wire brushes or the like.

Referring to the drawing, in the apparatus, in its preferred form, the numeral 10 designates a box-like casing or frame having opposite bearings 11, 12 in which a hollow spindle 13 is journaled on a horizontal axis. A chuck housing 14 is fixed to one projecting end of the spindle and has radial guideways 15 in which a plurality of chuck-arms 16 are slidably mounted for radial movement. Each chuck arm has a shoe 17 similar to a section of a tire-rim secured thereto for engaging the tire casing 18. The shoes 17 are of considerable arcuate extent so as to provide a substantial bearing for the beads of the tire casing and to prevent unreasonable distortion of the casing. They are provided with flanges 19 at one side to locate the bead of the tire. Pyramidal blocks 20 are also mounted on the shoes to center the tire by engaging between the beads thereof.

A generally cone-shaped cam 25 is slidably mounted on the end of the hollow spindle and its conical cam surfaces 26 engage the innermost ends of the chuck-arms. The chuck-arms are held normally toward the center of the chuck by springs 27 and are forced outwardly by movement of the cam toward the frame of the machine.

For actuating the chuck, a fluid pressure cylinder 28 is fixed to the opposite end of the spindle and a piston 29 fitted in said cylinder has a piston rod 30 fixed thereto which extends through the hollow spindle and is connected to the cam 25 by a yoke 31. Fluid under pressure is supplied to the cylinder by pipes 32, 33 connecting with hollow slip-rings 34, 35 fitted over a mill T 36 fixed to the cylinder 28 and rotatably therewith. A port 37 through the mill T is open to the left end of the cylinder in Fig. 5 and to the interior of slip-ring 34, the arrangement being such that the pipe 32 is connected to the cylinder at all times and the mill T rotates within the slip-ring. Similarly, the opposite end of the cylinder is connected by a passage 38 in the wall of the cylinder and a connecting passage 39 in the cylinder head with a port 40 in the mill T which opens to the interior of the slip-ring 35 and is connected at all times to pipe 33. The arrangement is such that the tire casing may be chucked or released while the spindle is rotating with saving of power and for efficient handling, and pressure may be applied during rotation of the spindle to hold the tire by fluid pressure constantly applied through pipe 33. A suitable valve (not shown) is used to control the flow of fluid under pressure.

The spindle 13 is conveniently driven from a motor 45 mounted within the casing 10 and for this purpose a multiple grooved pulley 46 is fixed to the motor shaft, a similar pulley 47 is fixed to the spindle 13, and a plurality of endless V-belts 48 encircle the two pulleys. Belt adjustment is provided by mounting the motor on a swing platform 49 pivoted at 50 to the frame or casing. An adjusting screw 51 is also fixed to the casing and extends through a clearance opening in the platform. Nuts 52, 53 engage the threaded screw 51 on either side of the platform and may be adjusted therealong to raise or lower the platform to tension the belts.

For supporting and manipulating the buffing wheels, a frame 60 is fixed to the floor 61 to which the frame 10 is also fixed, and has a pair of horizontal guideways 62, 63 (see Fig. 6), in which a carriage 64 is slidably mounted for horizontal movement perpendicular to the spindle axis. A horizontal shaft 65 is rotatably mounted transversely of the direction of movement of the carriage in bearings formed in the frame 60 and has a pair of pinions 66, 67 fixed thereto in position to mesh with a pair of racks 68, 69 fixed to the carriage. A hand wheel 70 is fixed to shaft 65 and permits manual rotation thereof to slide the carriage toward and from the spindle 13.

A pair of buffing wheels 75, 76 are fixed respectively to the shafts 77, 78 of a pair of buffing motors 79, 80 fixed to arms 81, 82 pivotally mounted on vertical posts 83, 84 fixed to carriage 64. The arrangement is such that the buffing wheels may be moved laterally toward or from the sidewalls of the tire about the pivots. Flexible wires (not shown) connect the motors to a source of electrical current and the motors are wired for rotation in opposite directions.

A coil spring 85 extends between the buffing motors and urges the buffing wheels laterally toward each other. For forcing them apart against the spring pressure, a post 90 is fixed to the carriage and a pair of grooved pulleys 91, 92 are rotatably and independently mounted thereon. A fluid pressure cylinder 93 is also fixed to the carriage and its piston rod 94 has a pulley 95 mounted thereon. A flexible cord 96 has a bight 97 looped about pulley 95 and its ends extend about pulleys 91, 92 respectively and are fixed to arms 81, 82 respectively. Fluid pressure may be admitted to the forward end of cylinder 93 through a pipe 98 to drive the piston 99 and piston rod 94 in a rearward direction permitting the buffing wheels 75, 76 to approach each other, or may be admitted to the rearward end of the cylinder through a pipe 100 to drive the piston 99 and piston rod 94 forwardly to separate the buffing wheels. Suitable flexible connections (not shown) and a valve (not shown) are provided to control fluid pressure to the cylinder 93.

To provide for operation of one buffing wheel at a time, an arm 110 is fixed to the carriage 64 and projects forwardly thereof. A latch 111 is hinged to the arm in position to engage over a projection 112 of the forward motor shaft bearing 113. When it is desired to operate the buffing wheel 76 alone, the piston 99 is actuated to spread the buffing wheels apart and the latch 111 is manually latched over the projection. Thereafter the cylinder 93 will control only the buffing wheel 76. In similar manner a second arm 114 at the opposite side of the carriage has a latch 115 pivoted thereto at 116 for engaging a projection 117 on the forward bearing of the other motor shaft bearing 118, for the purpose of latching the other buffing wheel 76 out of operative relation to the tire. This construction is especially useful where a tire has one light colored sidewall which shows discoloration and has a dark sidewall on the opposite side which does not show stain and need not be buffed.

While any suitable buffing wheel may be used depending upon the amount of abrasion desired or the character of the work, I prefer for buffing the sidewalls of tires to employ a plurality of flexible discs 120 mounted in side by side relation on the same shaft and formed of a soft vulcanized rubber composition, preferably one containing an abrasive such as fossil flour and a fibrous material, such as cotton linters.

The operation of the apparatus is as follows:

With the chuck collapsed and the buffing wheels spread apart at a position nearest the spindle, a tire casing 18 is placed thereon with its bead portions aligned with the shoes 17. Air or other fluid under pressure is admitted to the right end of cylinder 28 permitting the spring 85 to force the chuck shoes against the beads of the tire. The motor 45 is started and drives the tire casing in a counter-clockwise direction in Fig. 2, as indicated by the arrows. The buffing motors have been energized to rotate the buffing wheels at a speed of 1800 R. P. M. in the opposite direction to that of the tire as indicated by the arrows. With the spring 85 holding the buffing wheels toward each other they are advanced backward and forward over the sidewalls of the tire casing simultaneously by operating the hand wheel 70 manually. When it is desired to lift the buffing wheels out of contact with the tire, air under pressure is admitted to the right end of cylinder 93 in Fig. 4 and the wheels are withdrawn simultaneously. If desired, one buffing wheel may be latched out of tire contacting relation and the other operated alone. The cord 96 and associated pulleys permits operation of one or both buffing wheels and acts to equalize pressure and to permit the wheels to follow a tire not exactly aligned on the chuck.

The pliable discs of the buffing wheels spread out over a wide surface crossing each other's paths in their contact with the tire, thereby preventing the cutting of grooves in the tire. The abrasive rubber discs produce a smooth surface on the tire.

Variations may be made without departing from the scope of the invention as it is defined by the accompanying claims.

I claim:

1. Apparatus for buffing an annular tire article, said apparatus comprising a spindle adapted to be constantly rotated, a collapsible chuck mounted on said spindle and adapted radially to engage and disengage the beads of a tire casing placed thereon during rotation of said spindle, a carriage movable radially of said spindle, means for moving said carriage toward and away from said spindle, a pair of rotatable buffing wheels each pivotally mounted on said carriage for movement toward and away from a sidewall of the tire, constant-pressure means for forcing the buffing wheels against the tire, and means for simultaneously withdrawing the buffing wheels radially from said casing against such constant pressure means.

2. Apparatus for buffing an annular tire article, said apparatus comprising a spindle adapted to be rotated, a collapsible chuck mounted on said spindle and adapted radially to engage and disengage the tire casing during rotation of said spindle, a carriage movable radially toward and away from said spindle, means for moving said carriage toward and away from said spindle, a rotatable buffing wheel pivotally mounted on said carriage for movement toward and away from a sidewall of the tire article, continually urged pressure means for forcing the buffing wheel against the tire article, and means for withdrawing the buffing wheel radially from said casing against the force of said pressure means.

3. Apparatus for buffing an annular tire article, said apparatus comprising a spindle adapted to be rotated, a chuck mounted on said spindle and adapted to engage and disengage a tire casing placed thereon during rotation of said spindle, a carriage movable radially of said spindle, means for moving said carriage toward and away from said spindle, a pair of rotatable buffing wheels each pivotally mounted on said carriage for movement toward and away from a sidewall of the tire, continually urged pressure means for forcing the buffing wheels against the tire, and means for simultaneously withdrawing the buffing wheels radially from said casing against such forcing means.

WALTER J. STRONG.